United States Patent
Kasahara

(10) Patent No.: US 6,501,603 B2
(45) Date of Patent: Dec. 31, 2002

(54) MICROSCOPE OBJECTIVE LENS

(75) Inventor: Takashi Kasahara, Hino (JP)

(73) Assignee: Olympus Optical Co., Ltd., Tokyo (JP)

( * ) Notice: Subject to any disclaimer, the term of this patent is extended or adjusted under 35 U.S.C. 154(b) by 42 days.

(21) Appl. No.: 09/884,080

(22) Filed: Jun. 20, 2001

(65) Prior Publication Data

US 2002/0024744 A1 Feb. 28, 2002

(30) Foreign Application Priority Data

Jul. 14, 2000 (JP) .................................. 2000-214076

(51) Int. Cl.⁷ .............................................. G02B 21/02
(52) U.S. Cl. ............................... 359/656; 359/659
(58) Field of Search ................................. 359/656, 657, 359/658, 659

(56) References Cited

U.S. PATENT DOCUMENTS

| | | | |
|---|---|---|---|
| 5,517,360 A | 5/1996 | Suzuki | 359/658 |
| 5,982,559 A | * 11/1999 | Furutake | 359/656 |
| 6,456,430 B1 | * 9/2002 | Kasahara et al. | 359/380 |
| 2002/0024744 A1 | * 2/2002 | Kasahara | 359/656 |

FOREIGN PATENT DOCUMENTS

| | | |
|---|---|---|
| JP | 8-136816 | 5/1996 |
| JP | 10-274742 | 10/1998 |

\* cited by examiner

*Primary Examiner*—Georgia Epps
*Assistant Examiner*—David N. Spector
(74) *Attorney, Agent, or Firm*—Arnold International; Bruce Y. Arnold

(57) ABSTRACT

A microscope objective lens having a large aperture and yielding satisfactorily corrected, flat images. The microscope objective lens includes, in order from the object side, a first lens group G1 having an overall positive refractive power and a second lens group G2. The second lens group G2 includes plural Gauss lens sets G2A, G2C. Each Gauss lens set is formed of, in order from the object side, a meniscus-shaped optical element with its concave surface on the image side, and a meniscus-shaped optical element with its concave surface on the object side. Preferably, each of these meniscus-shaped optical elements is formed of two lens elements that are cemented together. Prescribed conditions are set forth to favorably correct various aberrations.

17 Claims, 12 Drawing Sheets

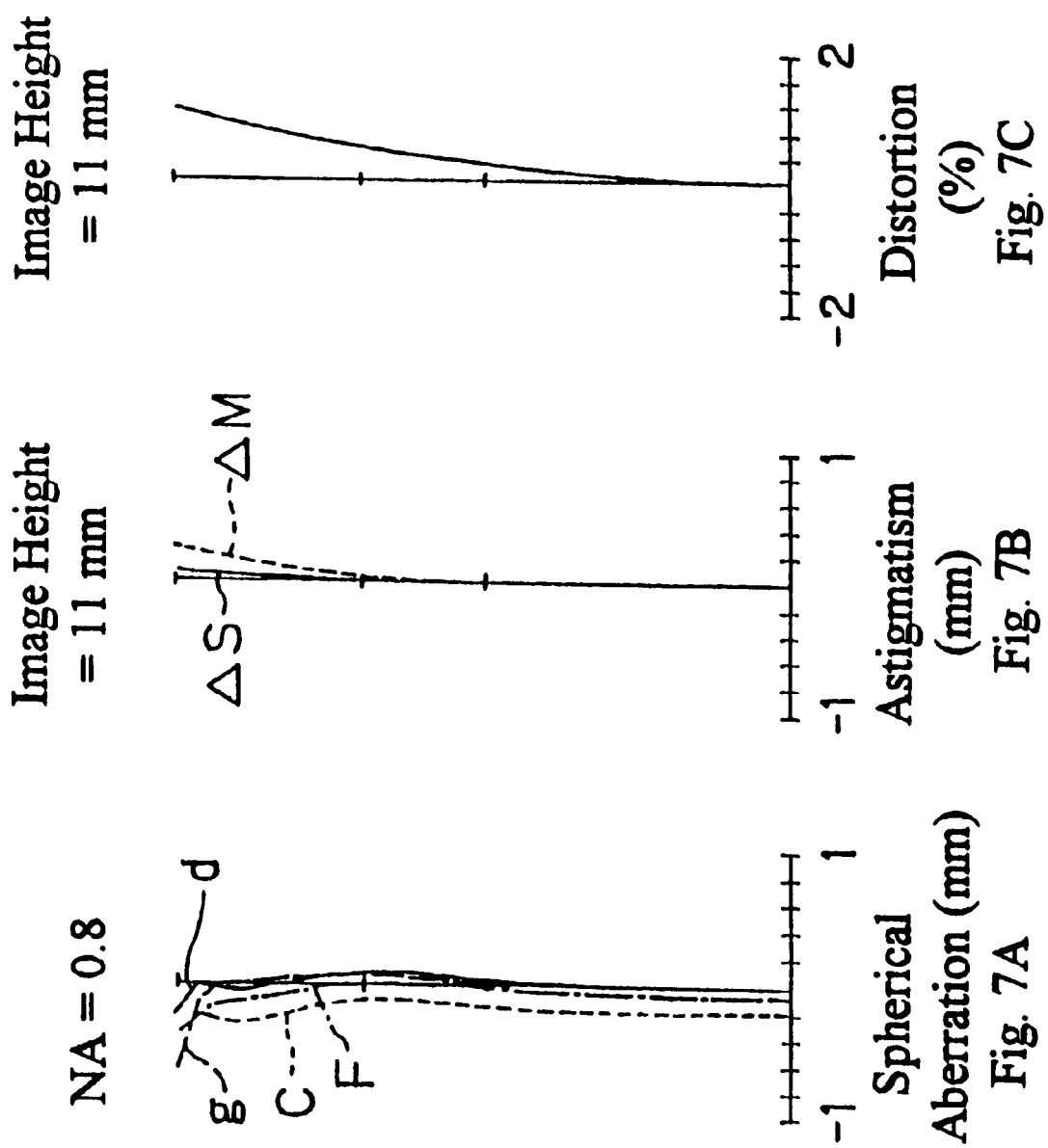

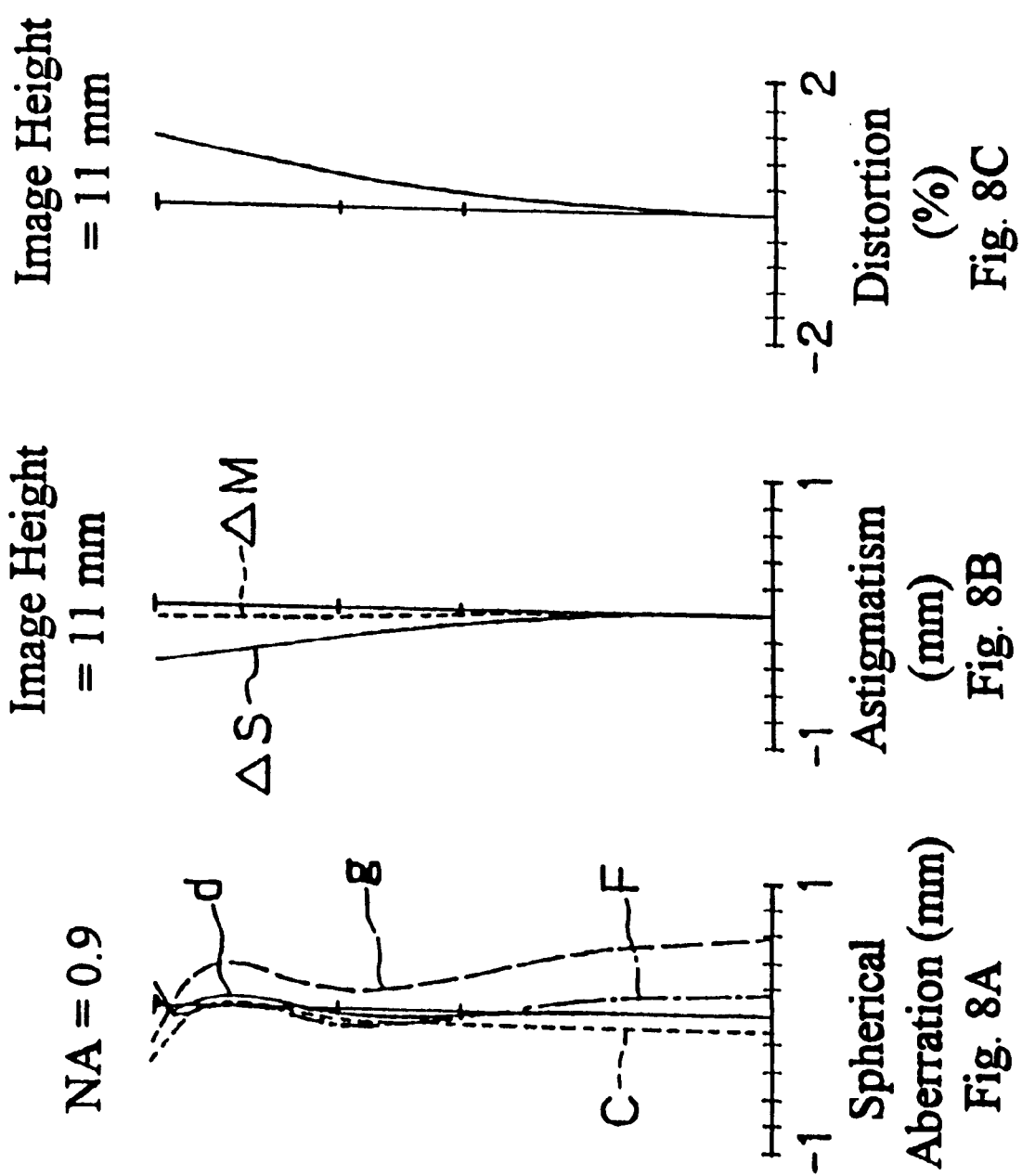

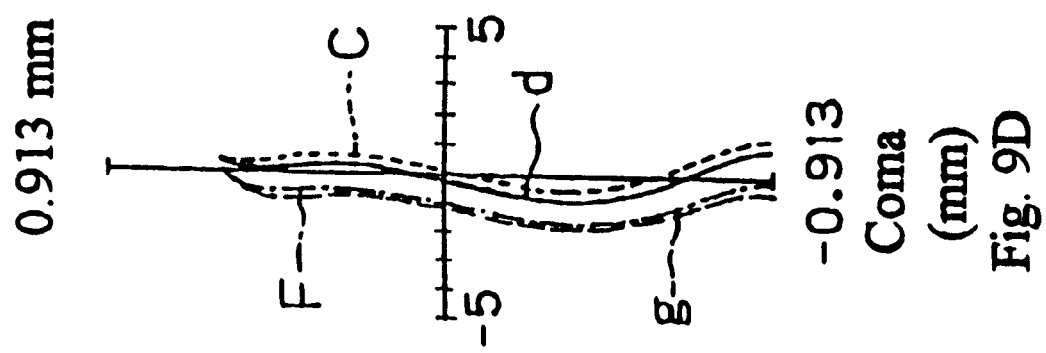
Fig. 9D Coma (mm)
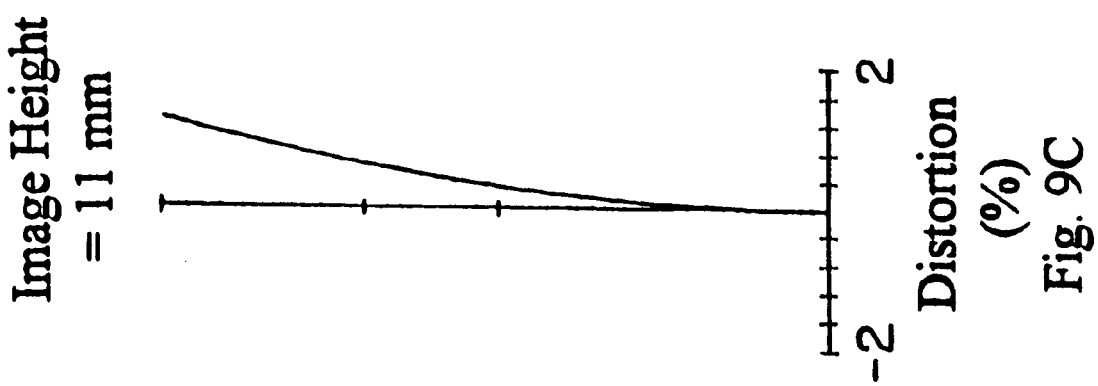
Fig. 9C Distortion (%)
Fig. 9B Astigmatism (mm)
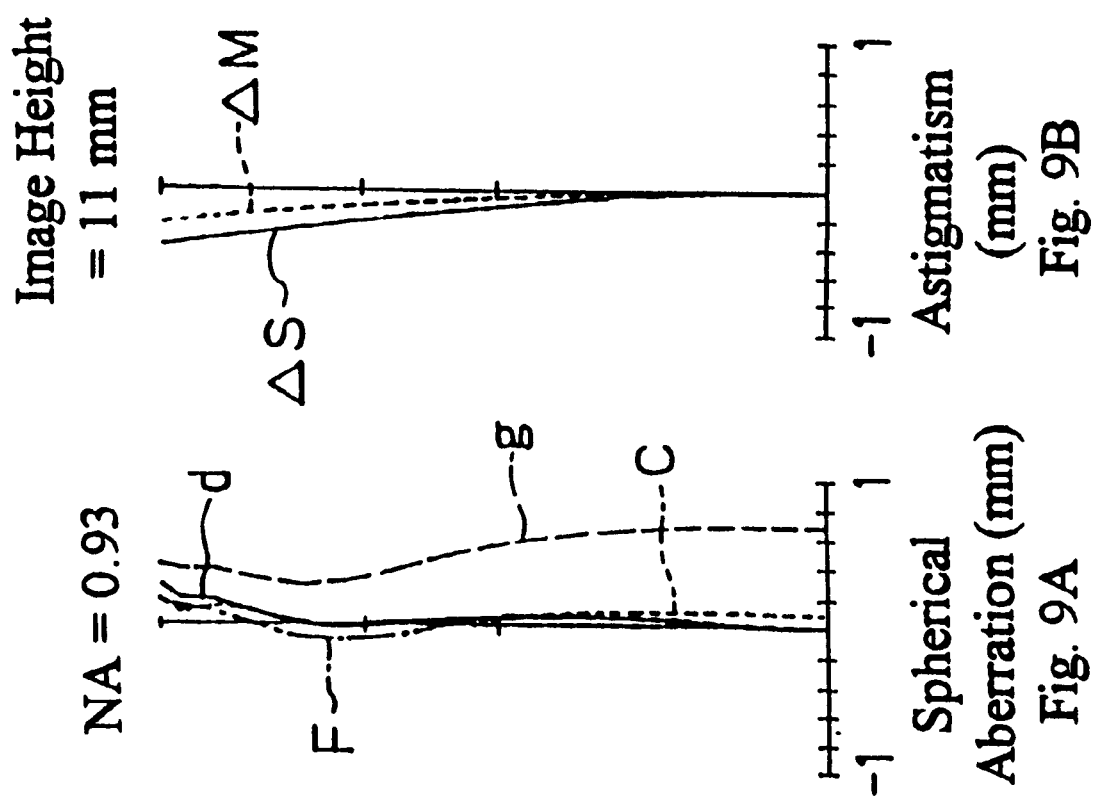
Fig. 9A Spherical Aberration (mm)

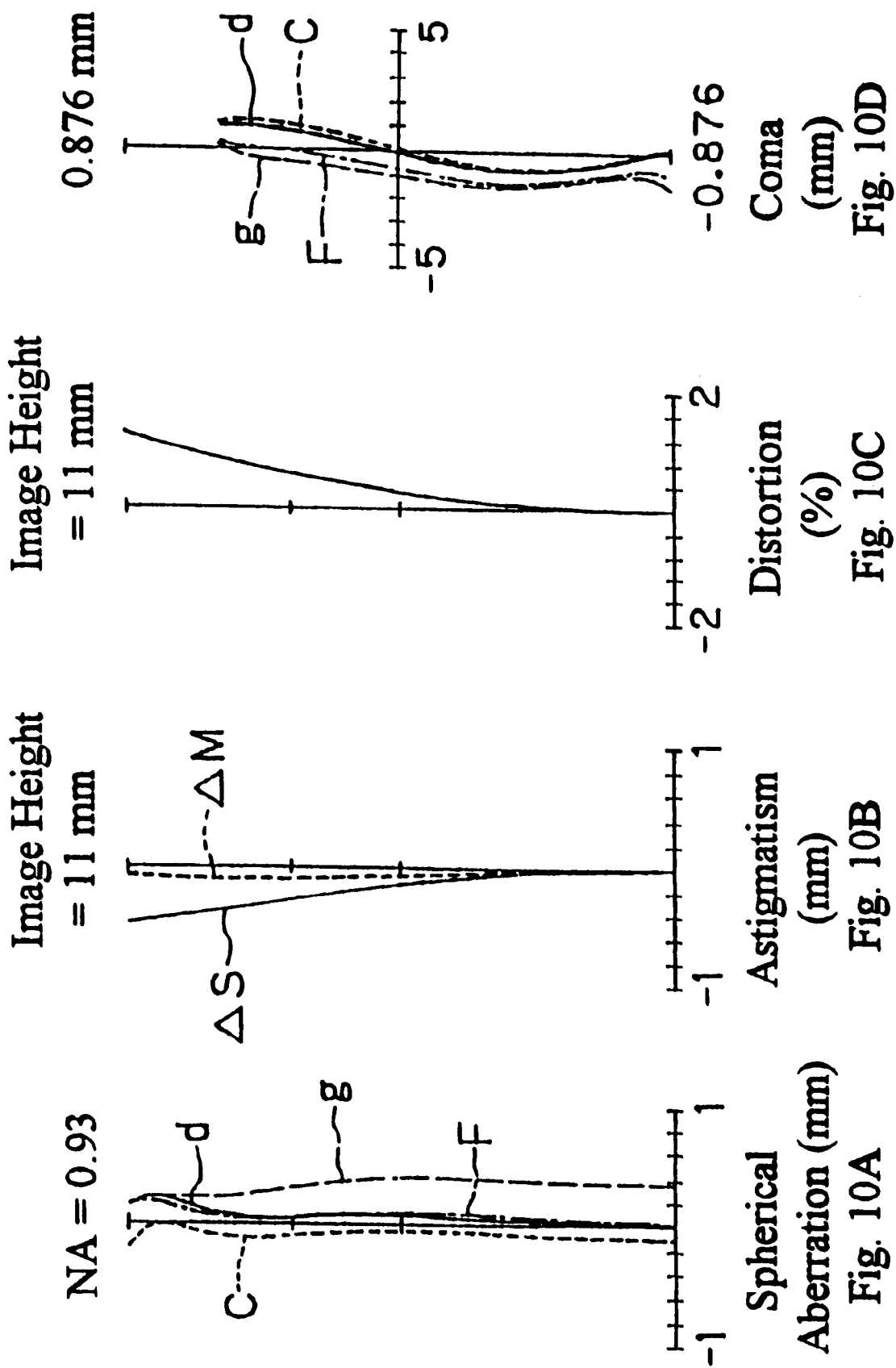

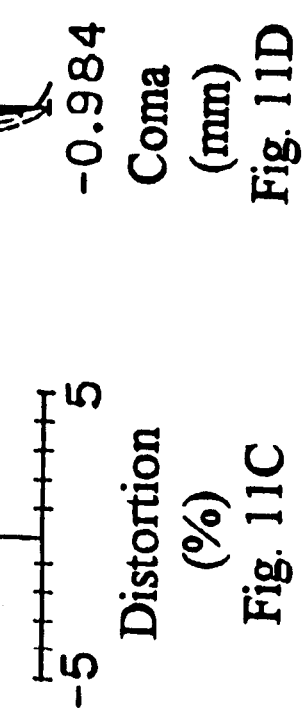
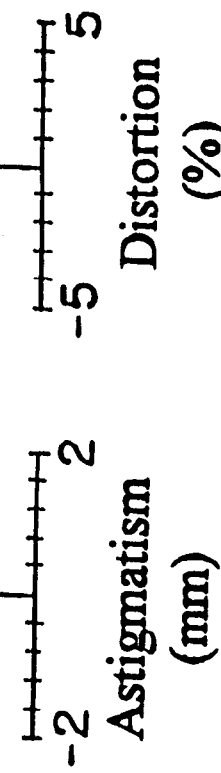
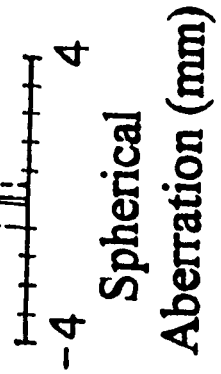
Fig. 11A Spherical Aberration (mm)
Fig. 11B Astigmatism (mm)
Fig. 11C Distortion (%)
Fig. 11D Coma (mm)

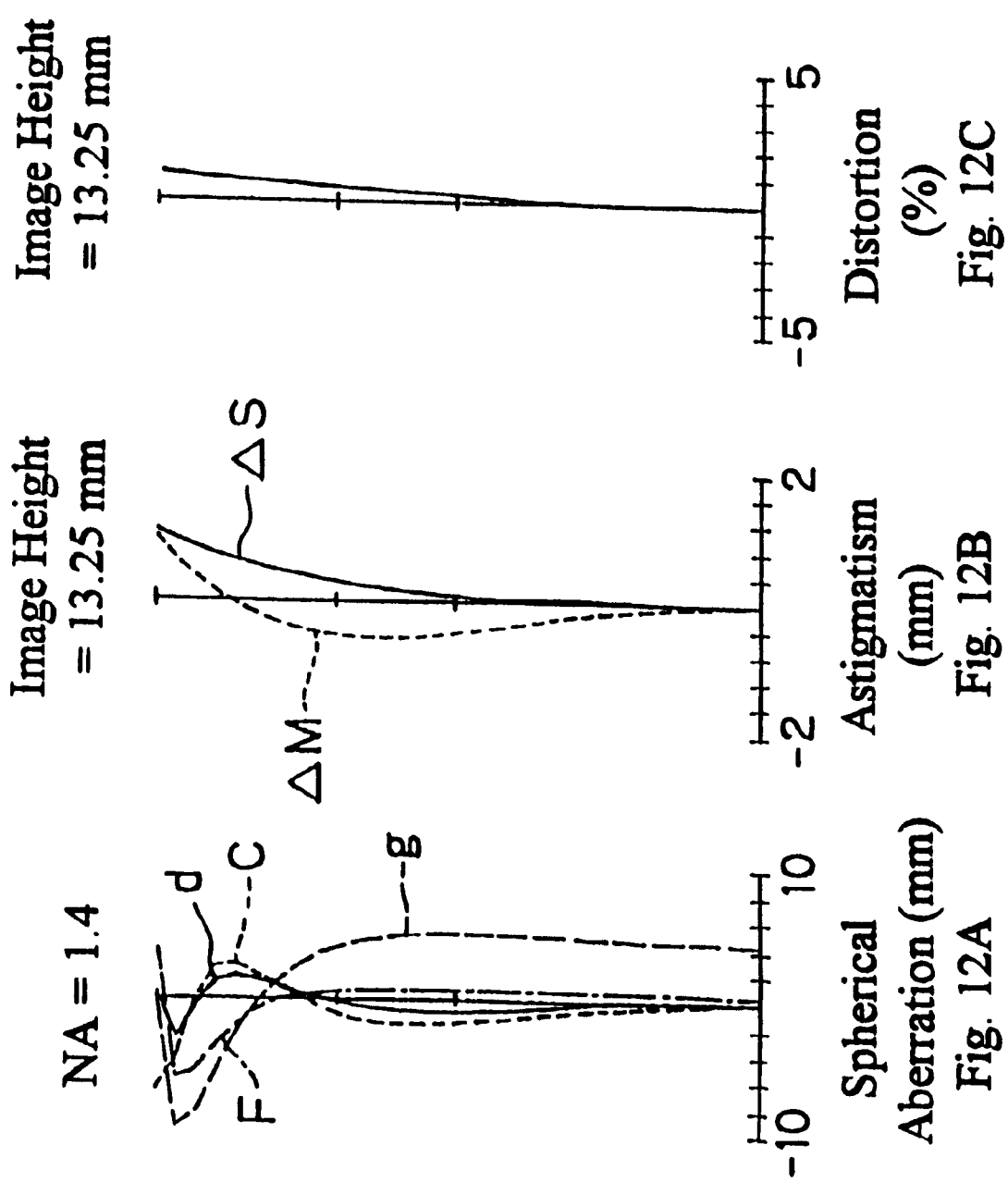

MICROSCOPE OBJECTIVE LENS

BACKGROUND OF THE INVENTION

Microscope objective lenses having a large numerical aperture are advantageous in improving resolution and brightness for observation using fluorescence. However, large numerical apertures hamper the forming of flat images. One of the lens types that facilitates forming flat images is a set of meniscus-shaped optical elements that hereinafter will be termed a Gauss lens set. Each meniscus-shaped optical element of a Gauss lens set may be formed of a positive lens element and a negative lens element that are cemented to form a single lens so that, overall, the lens is meniscus-shaped. One of these meniscus-shaped optical elements has its concave surface on the image side and the other has its concave surface on the object side so that the two concave surfaces are adjacent and face each other. Such a Gauss lens set can compensate for a positive Petzval sum (created by positive lenses) using the negative Petzval sum created by the negative refractive power of the facing concave surfaces of the meniscus-shaped optical elements, thereby controlling the curvature of field to ensure flat images.

Microscope objective lenses comprising a Gauss lens set having a large aperture and that facilitate the forming of flat images are described in the prior art. For example, Japanese Laid Open Patent Application No. H8-136816 has a Gauss lens set that provides a magnification of 20× and uses liquid immersion to achieve a numerical aperture of 0.8. Japanese Laid Open Patent Application No. H10-274742 has a Gauss lens set that provides a magnification of 40× and uses liquid immersion to achieve a numerical aperture of 1.3, and Japanese Laid Open Patent Application No. H7-35983 has a Gauss lens set that provides a magnification of 60× and uses liquid immersion to achieve a numerical aperture of 1.4. As in the prior art described above, a Gauss lens set is often used to ensure a flat image with an objective lens having a low magnification and a high numerical aperture, or with an objective lens that uses liquid immersion to achieve a high magnification and an even higher numerical aperture. However, there are limitations in ensuring a flat image with a low magnification using a lens having still higher numerical apertures or in obtaining flatter images using a lens having still higher magnifications.

BRIEF SUMMARY OF THE INVENTION

The object of the present invention is to provide a microscope objective lens having a large numerical aperture that ensures satisfactorily corrected, flat images.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 7A–7D show the spherical aberration, astigmatism, distortion and coma, respectively, of the objective lens of Embodiment 1 according to the present invention;

FIGS. 8A–8D show the spherical aberration, astigmatism, distortion and coma, respectively, of the objective lens of Embodiment 2 according to the present invention;

FIGS. 9A–9D show the spherical aberration, astigmatism, distortion and coma, respectively, of the objective lens of Embodiment 3 according to the present invention;

FIGS. 10A–10D show the spherical aberration, astigmatism, distortion and coma, respectively, of the objective lens of Embodiment 4 according to the present invention;

FIGS. 11A–11D show the spherical aberration, astigmatism, distortion and coma, respectively, of the objective lens of Embodiment 5 according to the present invention; and FIGS. 12A–12D show the spherical aberration, astigmatism, distortion and coma, respectively, of the objective lens of Embodiment 6 according to the present invention.

DETAILED DESCRIPTION

Figure 1:
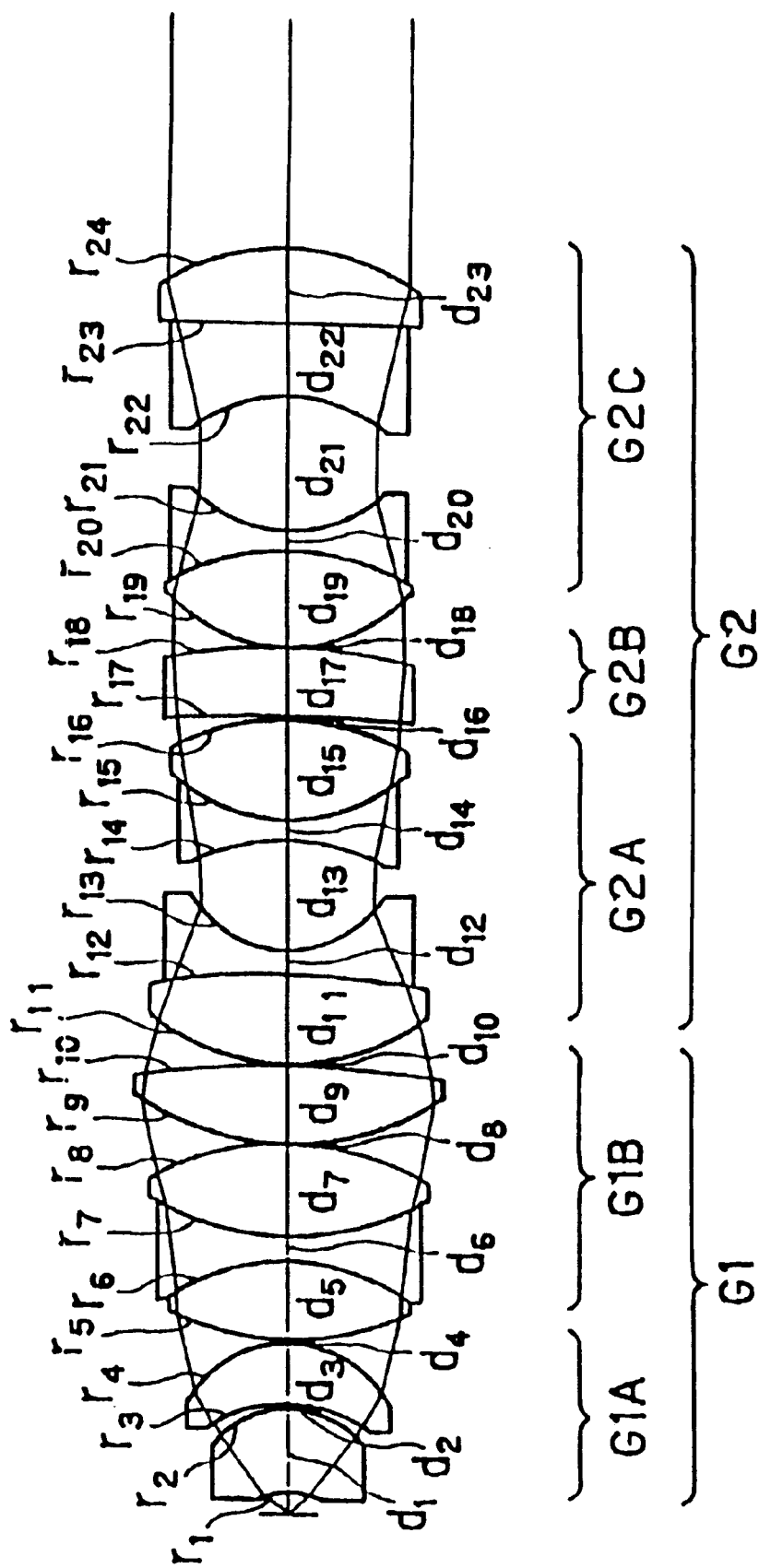
FIG. 1 is a cross section showing the lens element structure of the objective lens of Embodiment 1 according to the present invention.

The microscope objective lens according to the present invention includes, in sequential order from the object side: a first lens group having an overall positive refractive power, and a second lens group which includes two Gauss lens sets, with each Gauss lens set being formed of, in order from the object side, a meniscus-shaped optical element with its concave surface on the image side and a meniscus-shaped optical element with its concave surface on the object side, with both the concave surfaces being adjacent one another and facing each other.

The rationale and efficacy of the structure according to the present invention is hereinafter described. The Petzval sum has to be sufficiently corrected in order to ensure flat images. The first lens group having a positive refractive power yields a large positive Petzval sum if the objective lens has a large numerical aperture. Therefore, the present invention provides plural Gauss lens sets in the second lens group, with each Gauss lens set having two meniscus-shaped optical elements oriented so that their concave surfaces face each other. This creates a negative Petzval sum large enough to compensate for the large positive Petzval sum of the first lens group. If the objective lens has a large numerical aperture, much spherical aberration is generated due to the positive refractive power of the first lens group. The facing concave surfaces of the meniscus-shaped optical elements described above also effectively correct the spherical aberration. Using plural sets of these surfaces enables further improved correction. The spherical aberration can be corrected without difficulty by these plural sets of facing concave surfaces of the meniscus-shaped optical elements sharing the work. The facing concave surfaces of the meniscus-shaped optical elements are also useful for correcting asymmetrical aberrations, such as astigmatism and coma. Similarly to spherical aberration, these aberrations can be satisfactorily corrected by the plural sets of facing concave surfaces of the meniscus-shaped optical elements sharing the work.

As is described above, the present invention enables the balanced correction of aberrations including spherical aberration, astigmatism, and coma and, accordingly, the obtaining of both a large aperture and flat images.

The following problems will arise if an attempt is made to correct aberrations using a single Gauss lens set for an objective lens having a large numerical aperture. If a single Gauss lens set is used for correcting the Petzval sum, the facing concave surfaces of the meniscus-shaped optical elements should have an extremely small radius of curvature. This produces large spherical aberration, astigmatism, and coma, which are difficult to satisfactorily correct for the entire objective lens. It is also troublesome to manufacture and process the small-curvature, facing concave surfaces required in the case where only a single Gauss lens set is used for an objective lens having a large numerical aperture.

Thus, it is advantageous to use one or more additional Gauss lens sets for aberration correction. However, using more than two Gauss lens sets results in a longer objective lens. In addition, the additional lenses contribute to increased cost. Using no more than two Gauss lens sets likely allows for a balanced correction of spherical aberration, astigmatism, and coma. In such a case, the one nearer the object is mainly for correcting for spherical aberration and the one nearer the image is mainly for correcting for astigmatism and coma.

The following Condition (1) is preferably satisfied in the present invention:

$$3 \leq D/F \leq 35 \qquad \text{Condition (1)}$$

where

D is the distance between the object and the lens surface of the microscope objective lens that is nearest the image side, and F is the focal length of the microscope objective lens.

If the value of Condition (1) does not satisfy the lower limit, the total length of the objective lens is too small to hold plural Gauss lens sets. If the value of Condition (1) exceeds the upper limit, the total length of the objective lens can not be adjusted to have an appropriate length for an objective lens while maintaining a sufficient numerical aperture and flat images. If the total length of the objective lens exceeds the proper length, the entire microscope body becomes large and certain operations, such as changing the objective lens in order to obtain a different magnification, may become cumbersome.

For good balanced correction of longitudinal chromatic aberration and chromatic aberration of magnification, it is preferable in the present invention that at least two meniscus-shaped optical elements, in the plural Gauss lens sets of the second lens group, each be formed of a positive lens element and a negative lens element that are cemented together. In addition, it is preferable that the meniscus-shaped optical element that is nearest the image side and has its concave surface facing the object side be such a cemented lens. In this instance, it is preferred that the following Conditions (2) and (3) are satisfied:

$$\upsilon_{dne} > \upsilon_{dpe} \qquad \text{Condition (2)}$$

$$\upsilon_{dpi} > \upsilon_{dni} \qquad \text{Condition (3)}$$

where $\upsilon_{dne}$ and $\upsilon_{dpe}$ are the Abbe numbers, at the d line, of the negative and positive lens elements, respectively, that are cemented together to form the meniscus-shaped optical element that is nearest the image side of the Gauss lens set of the second lens group that is nearest the image side, and $\upsilon_{dpi}$ and $\upsilon_{dni}$ are the Abbe numbers, at the d line, of the positive and negative lens elements, respectively, that are cemented together to form one or more additional (i=1, and possibly higher) of the meniscus-shaped optical element(s) of the Gauss lens sets of the second lens group.

If Condition (2) is not satisfied, chromatic aberration of magnification will not be satisfactorily corrected. If Condition (3) is not satisfied, longitudinal chromatic aberration will not be satisfactorily corrected.

It is further preferred, for the balanced correction of longitudinal chromatic aberration and chromatic aberration of magnification, that each meniscus-shaped optical element in the Gauss lens sets be formed of a positive lens element and a negative lens element that are cemented together.

For more balanced correction of longitudinal chromatic aberration and chromatic aberration of magnification, it is preferred that the following Conditions (4) and (5) be satisfied:

$$|\upsilon_{dpe} - \upsilon_{dne}| \geq 15 \qquad \text{Condition (4)}$$

$$|\upsilon_{dpi} - \upsilon_{dni}| \geq 10 \qquad \text{Condition (5)}$$

where $\upsilon_{dpe}$, $\upsilon_{dne}$, $\upsilon_{dpi}$ and $\upsilon_{dni}$ are as defined above.

If Condition (4) is not satisfied, chromatic aberration of magnification will not be effectively corrected. If Condition (5) is not satisfied, longitudinal chromatic aberration will not be effectively corrected.

In the present invention, the first lens group preferably includes, in sequential order from the object side: a meniscus lens element with its concave surface on the object side, or a cemented lens formed of a planoconvex lens element that is cemented to a meniscus lens element having its concave surface on the object side; and, a lens group having plural interfaces, each interface formed of a positive lens element and a negative lens element that are cemented together. The lens group which is nearest the object should gently transform the light flux from the object into a converged light flux. Therefore, a meniscus lens having its concave surface on the object side is placed so as to transform the light flux from the object into a converging light flux with minimal spherical, as well as asymmetrical, aberrations.

It is preferred that the following Condition (6) is satisfied:

$$0.3 \leq r_n/r_p < 1 \qquad \text{Condition (6)}$$

where $r_n$ is the radius of curvature of the concave surface which faces the object side, of the meniscus lens in the first lens group that is nearest the object side, and $r_p$ is the radius of curvature of the convex surface which faces the image side, of the meniscus lens in the first lens group that is nearest the object side.

Condition (6) requires that the meniscus lens element nearest the object be nearly aplanatic. If the value of Condition (6) does not satisfy the lower limit, spherical aberration more likely occurs and the positive Petzval sum increases, impairing the flatness of the image. If the value of Condition (6) exceeds the upper limit, spherical aberration and asymmetrical aberrations are more likely to occur.

Using plural positive and negative lens elements that are cemented together when making the Gauss lens sets enables effective correction of spherical and longitudinal chromatic aberrations, provided that the positive and negative lens elements are made of glass materials having appropriate refractive indices and Abbe numbers.

When the second lens group of the present invention includes no more than two Gauss lens sets, the Gauss lens set nearer the object mainly corrects for spherical aberration. If this Gauss lens set has an overall negative refractive power, it allows the satisfactory correction of spherical aberration produced by the positive refractive power of the first lens group. It is preferable that the following Condition (7) is satisfied:

$$-0.8 \leq F/F_{g2a} > 0 \quad \text{Condition (7)}$$

where,

F is as defined above, and $F_{g2a}$ is the focal length of the Gauss lens set nearer the object.

If the value of Condition (7) does not satisfy the lower limit, the facing concave surfaces of the meniscus-shaped optical elements in this Gauss lens set will have a strong negative refractive power, likely producing astigmatism and coma on these surfaces. If the value of Condition (7) exceeds the upper limit, the facing concave surfaces of the meniscus-shaped optical elements in this Gauss lens set will have a weak negative refractive power, and thus be unable to satisfactorily correct spherical aberration.

When the second lens group of the present invention includes no more than two Gauss lens sets, the Gauss lens set nearer the image mainly corrects for astigmatism and coma. If this Gauss lens set has a weak refractive power, it will not generate excessive spherical aberration and will correct the astigmatism and coma, resulting in a balanced correction of spherical aberration, astigmatism and coma. It is also preferable that the following Condition (8) is satisfied:

$$-0.2 \leq F/F_{g2c} \leq 0.05 \quad \text{Condition (8)}$$

where

F is as defined above, and $F_{g2c}$ is the focal length of the Gauss lens set of the second lens group that is nearer the image.

If the value of Condition (8) does not satisfy the lower limit, the facing concave surfaces of the meniscus-shaped optical elements of the Gauss lens set nearer the image will produce large spherical aberration, hampering a balanced correction of spherical aberration, astigmatism, and coma. If the value of Condition (8) exceeds the upper limit, the facing concave surfaces of these meniscus-shaped optical elements will have a weak negative refractive power, being unable to effectively correct astigmatism and coma.

In order to obtain flatter images, the Gauss lens set that is nearer the image, among the two Gauss lens sets of the second lens group, should have a weaker negative refractive power, so that more balanced correction of spherical aberration, astigmatism, and coma is available. Thus, it is also preferred that the following Condition (9) is satisfied:

$$-0.1 \leq F/F_{g2c} \leq -0.01 \quad \text{Condition (9)}$$

where

F and $F_{g2c}$ are as defined above.

If the value of Condition (9) does not satisfy the lower limit, the facing concave surfaces of the meniscus-shaped optical elements of this Gauss lens set will likely produce large spherical aberration. If the value of Condition (9) exceeds the upper limit, these facing concave surfaces will likely have a weak negative refractive power, and thus be unable to sufficiently correct the astigmatism and coma, thereby hampering the obtaining of flatter images.

When the second lens group of the present invention includes no more than two Gauss lens sets, it is desirable that a lens having a positive refractive power be positioned between these two Gauss lens sets. The lens having a positive refractive power guides light flux from the Gauss lens set that is nearer the object to the Gauss lens set that is nearer the image. By means of this lens of positive refractive power, the facing concave surfaces of the meniscus-shaped optical elements of the Gauss lens sets can be designed with stronger negative refractive power, thereby allowing them to more effectively compensate for the positive Petzval sum.

Embodiments 1 to 6 of the microscope objective lens according to the present invention will now be described in detail.

Embodiment 1

As shown in FIG. 1, this embodiment includes, in sequential order from the object side, a first lens group G1 and a second lens group G2. The first lens group G1 is formed of a lens subgroup G1A and a lens subgroup G1B. Lens subgroup G1A is formed of two meniscus-shaped optical elements with their concave surfaces facing the object side, and lens subgroup G1B is formed of a cemented triplet and a biconvex lens element. The cemented triplet is formed of the following lens elements, in order from the object side: a biconvex lens element, a biconcave lens element, and a biconvex lens element. The second lens group G2 is formed of lens subgroups G2A, G2B and G2C. Lens subgroup G2A is a Gauss lens set, and lens subgroup G2C is a Gauss lens set. The Gauss lens set G2A is formed, in order from the object side, of a biconvex lens element that is cemented to a biconcave lens element (thereby forming a meniscus-shaped optical element), and a biconcave lens element that is cemented to a biconvex lens element (thereby forming a meniscus-shaped optical element). The lens subgroup G2B is formed of a positive meniscus lens element with its concave surface on the object side. The Gauss lens set G2C is formed of a biconvex lens element that is cemented to a biconcave lens element (thereby forming a meniscus-shaped optical element), and a negative meniscus lens element with its concave surface on the object side that is cemented to a positive meniscus lens element with its concave surface on the object side (thereby forming a meniscus-shaped optical element).

Table 1 below lists for each surface, in order from the object side, the surface number #, the radius of curvature R (in mm), the on-axis spacing D (in mm) between surfaces, as well as the index of refraction $N_d$ and the Abbe number $\upsilon_d$ (both at the d line) of each lens element of Embodiment 1. In the middle portion of the table are listed the values of the magnification β of the objective lens when combined with an imaging lens having a focal length of 180 mm, the numerical aperture NA, the focal length F of the entire microscope objective lens system, and the working distance WD between the object surface and the first lens surface of the first lens group G1. In the bottom portion of the table are listed the values corresponding to the listed Conditions.

TABLE 1

| # | R | D | $N_d$ | $\upsilon_d$ |
|---|---|---|---|---|
| 1 | −4.8742 | 4.8257 | 1.75500 | 52.32 |
| 2 | −5.4698 | 0.2000 | | |
| 3 | −8.2501 | 3.5000 | 1.56907 | 71.30 |
| 4 | −6.7964 | 0.1500 | | |
| 5 | 14.8325 | 4.6500 | 1.43875 | 94.99 |
| 6 | −11.8551 | 1.4000 | 1.75500 | 52.32 |
| 7 | 16.0509 | 5.1500 | 1.43875 | 94.99 |
| 8 | −16.7495 | 0.2000 | | |
| 9 | 16.6372 | 4.2443 | 1.56907 | 71.30 |
| 10 | −65.8633 | 0.2000 | | |
| 11 | 12.4106 | 5.1500 | 1.49700 | 81.14 |
| 12 | −46.1798 | 1.3800 | 1.52944 | 51.72 |
| 13 | 6.3567 | 6.4169 | | |
| 14 | −11.5515 | 1.2500 | 1.52944 | 51.72 |
| 15 | 10.5297 | 5.6154 | 1.49700 | 81.14 |
| 16 | −15.2713 | 0.2000 | | |
| 17 | −117.7917 | 4.0077 | 1.56907 | 71.30 |
| 18 | −33.7967 | 0.1500 | | |
| 19 | 10.0545 | 5.2930 | 1.49700 | 81.14 |
| 20 | −15.1795 | 1.3000 | 1.52130 | 52.55 |
| 21 | 8.0217 | 7.7007 | | |
| 22 | −9.5247 | 4.2061 | 1.58313 | 59.38 |
| 23 | −275.8289 | 4.3000 | 1.59551 | 39.29 |
| 24 | −12.9456 | | | |
| β = −20X | NA = 0.8 | F = 9 mm | | WD = 1.4 mm |
| Condition (1) value: | D/F | = | | 8.099 |
| Condition (4) value: | $\|\upsilon_{dpe} - \upsilon_{dne}\|$ | = | | 20.09 |
| Condition (5) value: | $\|\upsilon_{dpi} - \upsilon_{dni}\|$ | = | | 28.59 – 29.42 |
| Condition (6) value: | $r_n/r_p$ | = | | 0.891 |
| Condition (7) value: | $F/F_{g2a}$ | = | | −0.311 |
| Condition (8) value: | $F/F_{g2c}$ | = | | −0.02 |

FIGS. 7A–7D show the spherical aberration, astigmatism, distortion and coma, respectively, of the objective lens of Embodiment 1. The spherical aberration and coma are given for each of the C, d, F, and g lines, and the astigmatism is given for the sagittal ΔS and meridional ΔM image surfaces. As is apparent from these figures, the aberrations are favorably corrected for the entire image field.

Embodiment 2

Figure 2:
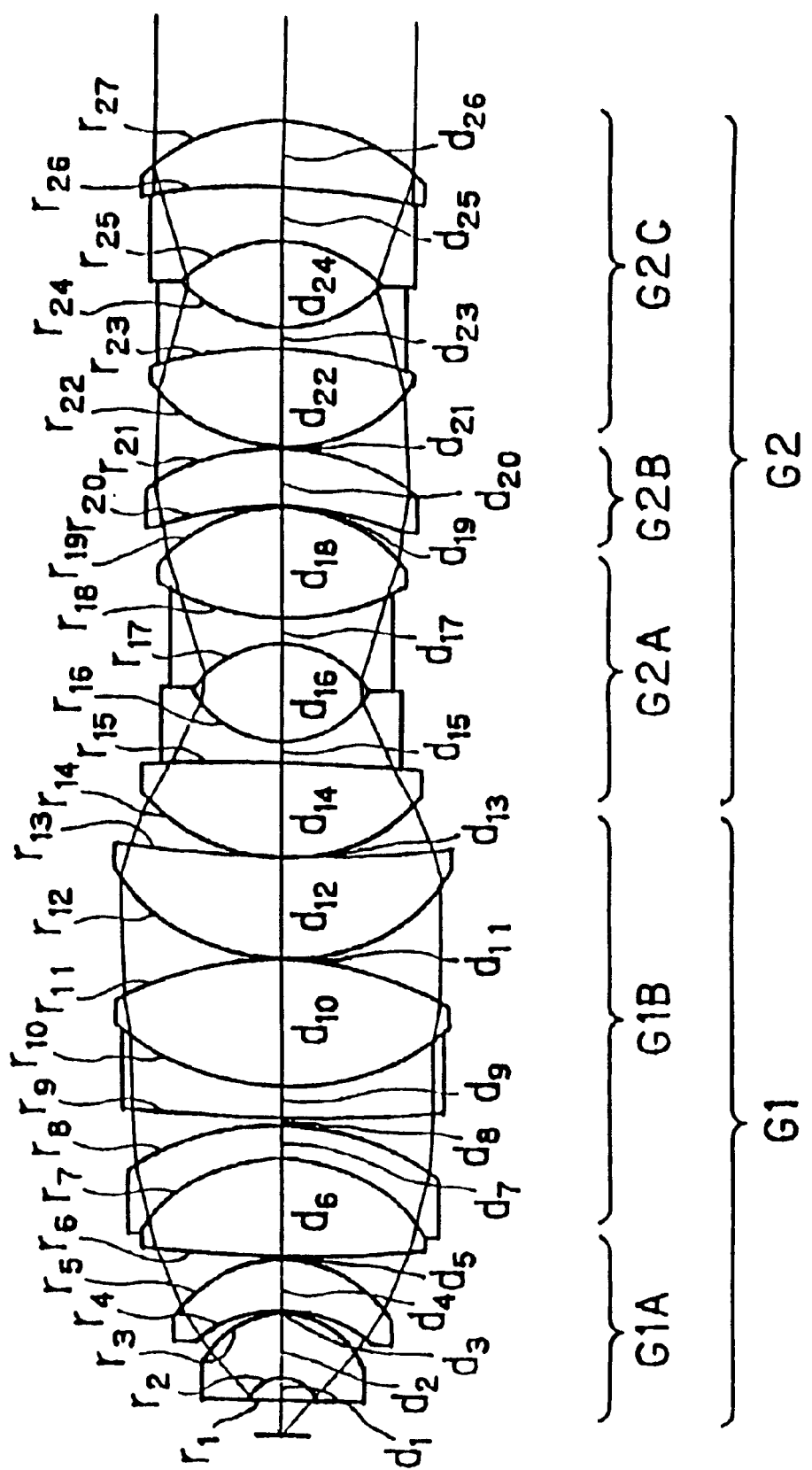
FIG. 2 is a cross section showing the lens element structure of the objective lens of Embodiment 2 according to the present invention.

As shown in FIG. 2, this embodiment includes, in order from the object side, a first lens group G1 and a second lens group G2. The first lens group G1 is formed of a lens subgroup G1A and a lens subgroup G1B. Lens subgroup G1A is formed of a planoconvex lens element that is cemented to a meniscus lens element with its concave surface on the object side, and a positive meniscus lens element with its concave surface on the object side. Lens subgroup G1B is formed of a biconvex lens element that is cemented to a negative meniscus lens element with its concave surface on the object side, a negative meniscus lens element with its concave surface on the image side that is joined to a biconvex lens element, and a positive meniscus lens element with its concave surface on the image side. The second lens group G2 is formed of lens subgroups G2A, G2B, and G2C, in order from the object side. Lens subgroup G2A is formed of a Gauss lens set. In order from the object side, it is formed of two cemented doublets, as follows: a biconvex lens element that is cemented to a biconcave lens element and a biconcave lens element that is cemented to a biconvex lens element, Lens subgroup G2B is formed of a positive meniscus lens element with its concave surface on the object side. Lens subgroup G2C is also a Gauss lens set. In order from the object side, it is formed of two cemented doublets, as follows: a biconvex lens element that is joined to a biconcave lens element, and a negative meniscus lens element with its concave surface on the object side that is joined to a positive meniscus lens element with its concave surface on the object side.

This embodiment uses liquid immersion. The immersion liquid between the object surface and the first lens surface of the first lens group G1 has a refractive index $N_d$ of 1.333 and an Abbe number $\upsilon_d$ of 55.79.

Table 2 below lists for each surface, in order from the object side, the surface number #, the radius of curvature R (in mm), the on-axis spacing D (in mm) between surfaces, as well as the index of refraction $N_d$ and the Abbe number $\upsilon_d$ (both at the d line) of each lens element of Embodiment 2. In the middle portion of the table are listed the values of the magnification β of the objective lens when combined with an imaging lens having a focal length of 180 mm, the numerical aperture NA, the focal length F of the entire microscope objective lens system, and the working distance WD between the object surface and the first lens surface of the first lens group G1. In the bottom portion of the table are listed the values corresponding to the listed Conditions.

TABLE 2

| # | R | D | $N_d$ | $\upsilon_d$ |
|---|---|---|---|---|
| 1 | ∞ | 1.6100 | 1.45853 | 67.94 |
| 2 | −2.2970 | 3.7143 | 1.75500 | 52.32 |
| 3 | −5.6288 | 0.2000 | | |
| 4 | −8.6328 | 3.0000 | 1.56907 | 71.30 |
| 5 | −8.0909 | 0.1500 | | |
| 6 | 73.1879 | 6.0000 | 1.49700 | 81.14 |
| 7 | −10.4587 | 1.9500 | 1.52944 | 51.72 |
| 8 | −16.3873 | 0.5000 | | |
| 9 | 128.2655 | 2.0000 | 1.75500 | 52.32 |
| 10 | 16.2153 | 7.5905 | 1.43875 | 94.99 |
| 11 | −20.1886 | 0.1500 | | |
| 12 | 12.7010 | 5.9843 | 1.43875 | 94.99 |
| 13 | 86.7269 | 0.1500 | | |
| 14 | 11.6470 | 5.6132 | 1.43875 | 94.99 |
| 15 | −151.8782 | 1.5000 | 1.61340 | 43.84 |
| 16 | 6.2181 | 5.8619 | | |
| 17 | −6.2450 | 1.4500 | 1.52944 | 51.72 |
| 18 | 14.6373 | 6.6500 | 1.43875 | 94.99 |
| 19 | −9.7286 | 0.2000 | | |
| 20 | −20.9950 | 3.4676 | 1.49700 | 81.14 |
| 21 | −13.3368 | 0.1500 | | |
| 22 | 10.4156 | 5.6500 | 1.43875 | 94.99 |
| 23 | −27.3967 | 1.5000 | 1.52944 | 51.72 |
| 24 | 8.8947 | 5.3000 | | |
| 25 | −8.0054 | 3.0344 | 1.51633 | 64.14 |
| 26 | −45.3570 | 4.1005 | 1.62004 | 36.27 |
| 27 | −11.9255 | | | |
| β = −20X | NA = 0.9 | F = 9 mm | | WD = 2.05 mm |
| Condition (1) value: | D/F | = | | 8.837 |
| Condition (4) value: | $\|\upsilon_{dpe} - \upsilon_{dne}\|$ | = | | 27.87 |
| Condition (5) value: | $\|\upsilon_{dpi} - \upsilon_{dni}\|$ | = | | 43.27 – 51.15 |
| Condition (6) value: | $r_n/r_p$ | = | | 0.408 |
| Condition (7) value: | $F/F_{g2a}$ | = | | −0.529 |
| Condition (8) value: | $F/F_{g2c}$ | = | | −0.052 |

FIGS. 8A–8D show the spherical aberration, astigmatism, distortion and coma, respectively, of the objective lens of Embodiment 2. The spherical aberration and coma are given for each of the C, d, F, and g lines, and the astigmatism is given for the sagittal ΔS and meridional ΔM image surfaces. As is apparent from these figures, the aberrations are favorably corrected for the entire image field.

Embodiment 3

Figure 3:
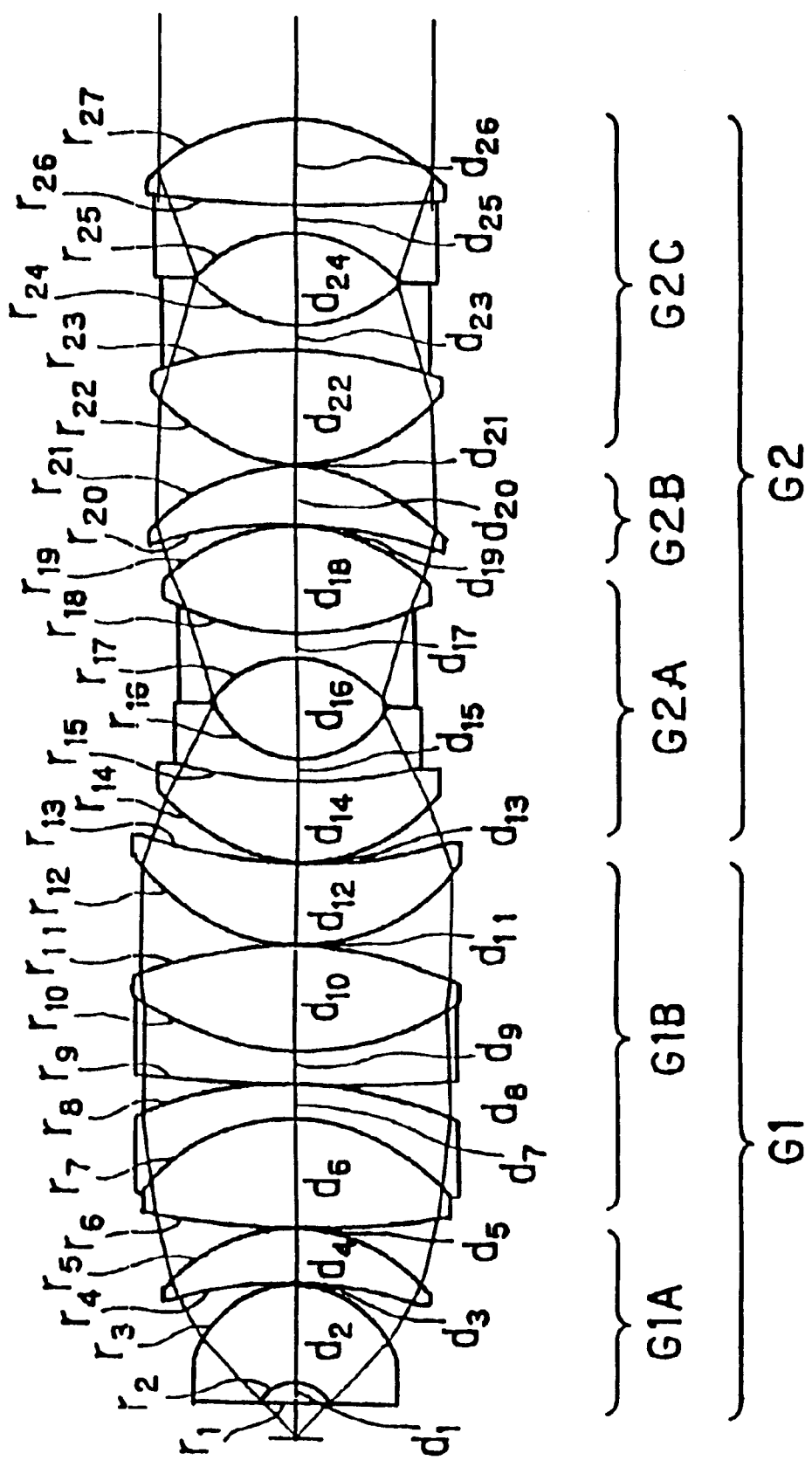
FIG. 3 is a cross section showing the lens element structure of the objective lens of Embodiment 3 according to the present invention.

As shown in FIG. 3, this embodiment includes, in order from the object side, a first lens group G1 and a second lens group G2. The first lens group G1 is formed of a lens subgroup G1A and a lens subgroup G1B. Lens subgroup G1A includes a cemented doublet formed of a planoconvex lens element that is joined to a meniscus lens element with its concave surface on the object side, and a positive meniscus lens element with its concave surface on the object side. Lens subgroup G1B is formed of a cemented doublet formed of a biconvex lens element that is joined to a negative meniscus lens element with its concave surface on the object side, a cemented doublet formed of a negative meniscus lens element with its concave surface on the image side that is joined to a biconvex lens element, and a positive meniscus lens element with its concave surface on the image side.

The second lens group G2 is formed of lens subgroups G2A, G2B, and G2C, in order from the object side. Lens subgroup G2A is a Gauss lens set. In order from the object side, it is formed of two cemented doublets, as follows: a positive meniscus lens element with its concave surface on the image side joined to a negative meniscus lens element with its concave surface on the image side, and a biconcave lens element that is joined to a biconvex lens element. Lens subgroup G2B is formed of a positive meniscus lens element with its concave surface on the object side. Lens subgroup G2C is also a Gauss lens set. In order from the object side, it is formed of two cemented doublets, as follows: a biconvex lens element that is joined to a biconcave lens element, and a negative biconcave lens element that is joined to a biconvex lens element.

This embodiment uses liquid immersion. The immersion liquid between the object surface and the first lens surface of the first lens group G1 has a refractive index of 1.333 and an Abbe number of 55.79.

Table 3 below lists for each surface, in order from the object side, the surface number #, the radius of curvature R (in mm), the on-axis spacing D (in mm) between surfaces, as well as the index of refraction $N_d$ and the Abbe number $\upsilon_d$ (both at the d line) of each lens element of Embodiment 3. In the middle portion of the table are listed the values of the magnification β of the objective lens when combined with an imaging lens having a focal length of 180 mm, the numerical aperture NA, the focal length F of the entire microscope objective lens system, and the working distance WD between the object surface and the first lens surface of the first lens group G1. In the bottom portion of the table are listed the values corresponding to the listed Conditions.

TABLE 3

| # | R | D | $N_d$ | $\upsilon_d$ |
|---|---|---|---|---|
| 1 | ∞ | 1.6100 | 1.45853 | 67.94 |
| 2 | −2.4060 | 5.7597 | 1.75500 | 52.32 |
| 3 | −6.5059 | 0.2000 | | |
| 4 | −25.5003 | 3.1500 | 1.49700 | 81.08 |
| 5 | −10.9323 | 0.1200 | | |
| 6 | 56.1096 | 6.4800 | 1.49700 | 81.08 |
| 7 | −11.9889 | 1.9500 | 1.52944 | 51.72 |
| 8 | −25.3665 | 0.1200 | | |
| 9 | 223.7456 | 1.9500 | 1.75500 | 52.32 |
| 10 | 17.0397 | 6.5000 | 1.43875 | 94.99 |
| 11 | −25.4913 | 0.1200 | | |
| 12 | 12.1419 | 4.8264 | 1.43875 | 94.99 |
| 13 | 30.1344 | 0.2000 | | |
| 14 | 10.8233 | 4.7695 | 1.43875 | 94.99 |
| 15 | 26.5356 | 1.5024 | 1.59551 | 39.21 |
| 16 | 6.2707 | 6.1162 | | |
| 17 | −6.9886 | 1.5000 | 1.61340 | 43.84 |
| 18 | 18.1665 | 6.3698 | 1.43875 | 94.99 |
| 19 | −11.5665 | 0.2500 | | |
| 20 | −26.3050 | 3.3649 | 1.49700 | 81.08 |
| 21 | −11.8757 | 0.1200 | | |
| 22 | 10.9414 | 7.0500 | 1.43875 | 94.99 |

TABLE 3-continued

| 23 | −25.6275 | 1.6500 | 1.52944 | 51.72 |
|---|---|---|---|---|
| 24 | 8.8733 | 5.6500 | | |
| 25 | −8.4093 | 1.7500 | 1.51633 | 64.14 |
| 26 | 95.8203 | 5.1500 | 1.61293 | 36.99 |
| 27 | −12.3982 | | | |

β = −20X  NA = 0.94  F = 9.006 mm  WD = 2.04 mm
Condition (1) value: D/F = 8.914
Condition (4) value: $|\upsilon_{dpe} - \upsilon_{dne}|$ = 27.15
Condition (5) value: $|\upsilon_{dpi} - \upsilon_{dni}|$ = 43.27 − 55.78
Condition (6) value: $r_n/r_p$ = 0.369
Condition (7) value: $F/F_{g2a}$ = −0.609
Condition (8) value: $F/F_{g2c}$ = −0.043

FIGS. 9A–9D show the spherical aberration, astigmatism, distortion and coma, respectively, of the objective lens of Embodiment 3. The spherical aberration and coma are given for each of the C, d, F, and g lines, and the astigmatism is given for the sagittal ΔS and meridional ΔM image surfaces. As is apparent from these figures, the aberrations are favorably corrected for the entire image field.

Embodiment 4

Figure 4:
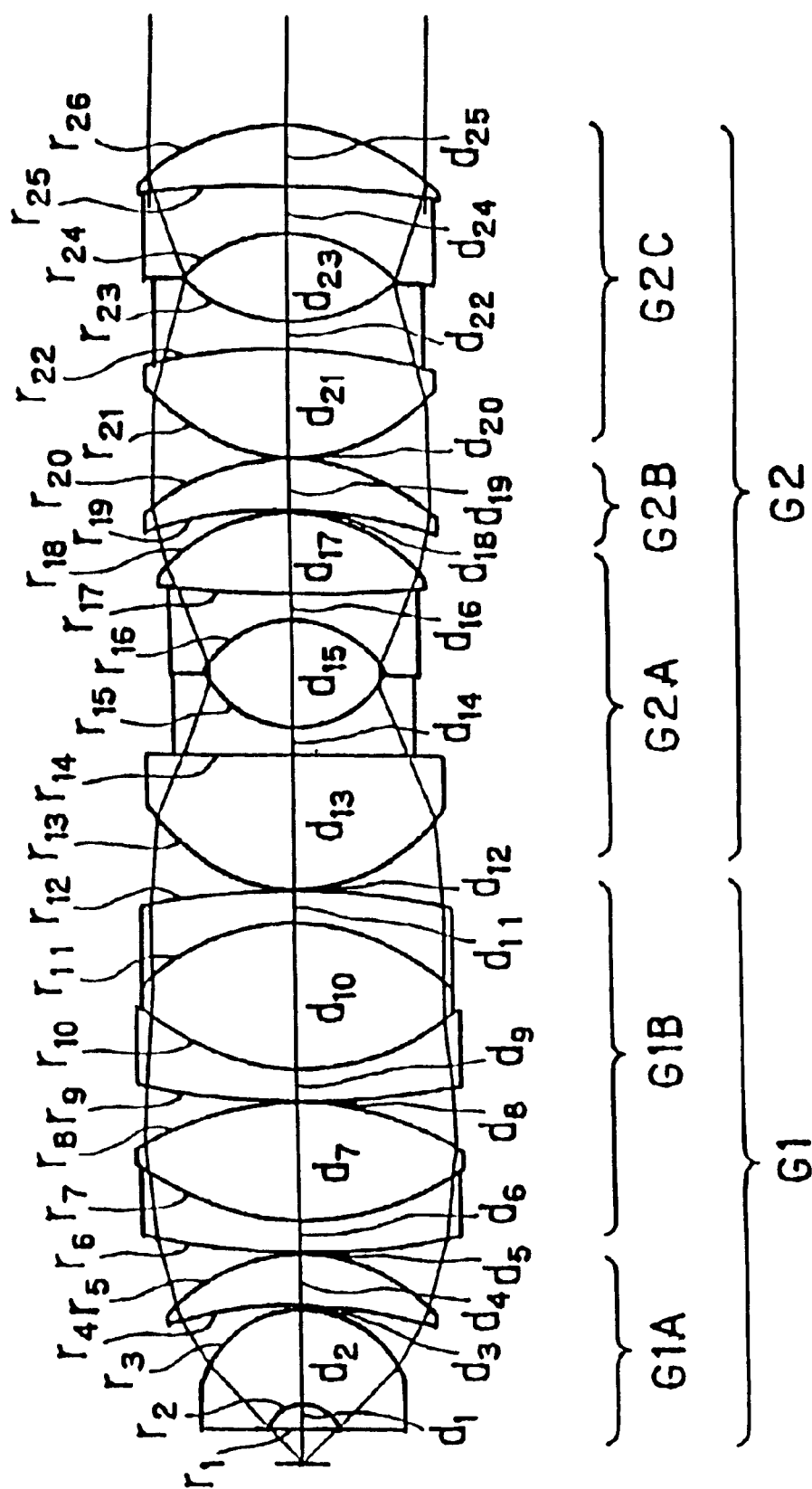
FIG. 4 is a cross section showing the lens element structure of the objective lens of Embodiment 4 according to the present invention.

As shown in FIG. 4, this embodiment includes, in order from the object side, a first lens group G1 and a second lens group G2. The first lens group G1 is formed of a lens subgroup G1A and a lens subgroup G1B. Lens subgroup G1A is formed of a planoconvex lens element that is cemented to a meniscus lens element with its concave surface on the object side, and a positive meniscus lens element with its concave surface on the object side. Lens subgroup G1B is formed of a negative meniscus lens element with its concave surface on the image side that is cemented to a biconvex lens element, and a cemented triplet made of a negative meniscus lens element with its concave surface on the image side, a biconvex lens element, and a negative meniscus lens element with its concave surface on the object side. The second lens group G2 is formed of lens subgroups G2A, G2B, and G2C, in order from the object side. Lens subgroup G2A is a Gauss lens set. In order from the object side, it is formed of two cemented doublets, as follows: a convex-plano lens element that is joined to a plano-concave lens element with its concave surface on the image side, and a biconcave lens element that is joined to a biconvex lens element. Lens subgroup G2B is formed of a positive meniscus lens element with its concave surface on the object side. Lens subgroup G2C is also a Gauss lens set. In order from the object side, it is formed of two cemented doublets, as follows: a biconvex lens element that is joined to a biconcave lens element, and a negative meniscus lens element with its concave surface on the object side that is joined to a positive meniscus lens element with its concave surface on the object side.

This embodiment uses liquid immersion. The immersion liquid between the object surface and the first lens surface of the first lens group G1 has a refractive index of 1.333 and an Abbe number of 55.79.

Table 4 below lists for each surface, in order from the object side, the surface number #, the radius of curvature R (in mm), the on-axis spacing D (in mm) between surfaces, as well as the index of refraction $N_d$ and the Abbe number $\upsilon_d$ (both at the d line) of each lens element of Embodiment 4. In the middle portion of the table are listed the values of the magnification β of the objective lens when combined with an imaging lens having a focal length of 180 mm, the numerical aperture NA, the focal length F of the entire microscope objective lens system, and the working distance WD between the object surface and the first lens surface of the first lens group G1. In the bottom portion of the table are listed the values corresponding to the listed Conditions.

TABLE 4

| # | R | D | $N_d$ | $\nu_d$ |
|---|---|---|---|---|
| 1 | ∞ | 1.6500 | 1.45853 | 67.94 |
| 2 | −2.3390 | 5.6698 | 1.75500 | 52.32 |
| 3 | −6.4851 | 0.1500 | | |
| 4 | −27.7022 | 3.0000 | 1.49700 | 81.14 |
| 5 | −11.0264 | 0.1500 | | |
| 6 | 45.4018 | 1.9000 | 1.52944 | 51.72 |
| 7 | 16.3243 | 7.0000 | 1.43875 | 94.99 |
| 8 | −18.5578 | 0.1500 | | |
| 9 | 51.9571 | 1.9000 | 1.52944 | 51.72 |
| 10 | 13.6959 | 8.8687 | 1.43875 | 94.99 |
| 11 | −13.0402 | 1.9000 | 1.52944 | 51.72 |
| 12 | −45.0735 | 0.1500 | | |
| 13 | 10.3689 | 8.0809 | 1.49700 | 81.14 |
| 14 | ∞ | 1.5000 | 1.61340 | 43.84 |
| 15 | 6.3851 | 6.5000 | | |
| 16 | −6.6718 | 1.5000 | 1.52944 | 51.72 |
| 17 | 96.0772 | 4.8455 | 1.43875 | 94.99 |
| 18 | −9.8547 | 0.2000 | | |
| 19 | −26.3960 | 3.0000 | 1.49700 | 81.14 |
| 20 | −12.9282 | 0.1500 | | |
| 21 | 11.4024 | 6.5186 | 1.43875 | 94.99 |
| 22 | −31.5209 | 1.5000 | 1.52944 | 51.72 |
| 23 | 9.6596 | 5.5000 | | |
| 24 | −8.7467 | 2.7692 | 1.51633 | 64.14 |
| 25 | −57.3280 | 3.6452 | 1.62004 | 36.27 |
| 26 | −12.2264 | | | |

$\beta = -20X$  NA = 0.94  F = 9.005 mm  WD = 2.05 mm
Condition (1) value: D/F = 8.911
Condition (4) value: $|\nu_{dpe} - \nu_{dne}|$ = 27.87
Condition (5) value: $|\nu_{dpi} - \nu_{dni}|$ = 37.3 – 43.27
Condition (6) value: $r_n/r_p$ = 0.361
Condition (7) value: $F/F_{g2a}$ = −0.288
Condition (8) value: $F/F_{g2c}$ = −0.036

FIGS. 10A–10D show the spherical aberration, astigmatism, distortion and coma, respectively, of the objective lens of Embodiment 4. The spherical aberration and coma are given for each of the C, d, F, and g lines, and the astigmatism is given for the sagittal ΔS and meridional ΔM image surfaces. As is apparent from these figures, the aberrations are favorably corrected for the entire image field.

Embodiment 5

Figure 5:
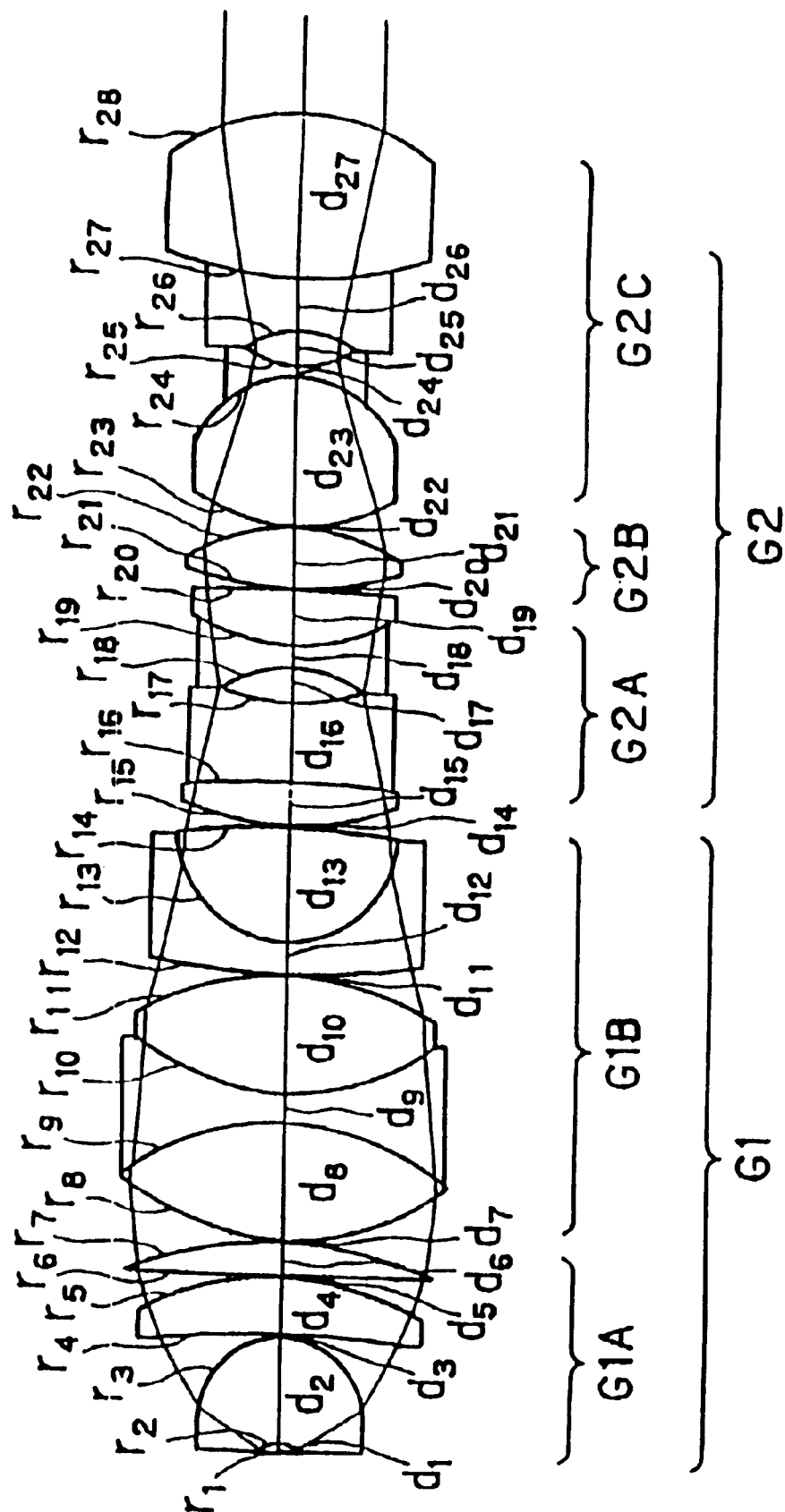
FIG. 5 is a cross section showing the lens element structure of the objective lens of Embodiment 5 according to the present invention.

As shown in FIG. 5, this embodiment includes, in order from the object side, a first lens group G1 and a second lens group G2. The first lens group G1 is formed of a lens subgroup G1A and a lens subgroup G1B. Lens subgroup G1A includes a cemented doublet, a positive meniscus lens element and a biconvex lens element. The cemented doublet is formed of a plano-convex lens element that is joined to a meniscus lens element with its concave surface on the object side, and the positive meniscus lens element has its concave surface on the object side. Lens subgroup G1B is formed of a cemented triplet made of a biconvex lens element that is joined to a biconcave lens element, which in turn is joined to a biconvex lens element, and a cemented doublet made of a negative meniscus lens element with its concave surface on the image side that is joined to a biconvex lens element. The second lens group G2 is formed of lens subgroups G2A, G2B, and G2C, in order from the object side. Lens subgroup G2A is a Gauss lens set. In order from the object side, it is formed of two cemented doublets, as follows: a biconvex lens element that is joined to a biconcave lens element, and a biconcave lens element that is joined to a biconvex lens element. Lens subgroup G2B is formed of a biconvex lens element. Lens subgroup G2C is also a Gauss lens set. In order from the object side, it is formed of two cemented doublets, as follows: a biconvex lens element that is joined to a biconcave lens element, and a biconcave lens element that is joined to a biconvex lens element.

This embodiment uses liquid immersion, and is designed with a cover glass having a refractive index of 1.521, an Abbe number of 56.02, and a thickness of 0.17 mm. The immersion liquid between the object surface and the first lens surface of the first lens group G1 has a refractive index of 1.515 and an Abbe number of 43.1.

Table 5 below lists for each surface, in order from the object side, the surface number #, the radius of curvature R (in mm), the on-axis spacing D (in mm) between surfaces, as well as the index of refraction $N_d$ and the Abbe number $\nu_d$ (both at the d line) of each lens element of Embodiment 5. In the middle portion of the table are listed the values of the magnification β of the objective lens when combined with an imaging lens having a focal length of 180 mm, the numerical aperture NA, the focal length F of the entire microscope objective lens system, and the working distance WD between the object surface and the first lens surface of the first lens group G1. In the bottom portion of the table are listed the values corresponding to the listed Conditions.

TABLE 5

| # | R | D | $N_d$ | $\nu_d$ |
|---|---|---|---|---|
| 1 | ∞ | 0.2500 | 1.51633 | 64.15 |
| 2 | −1.8293 | 5.6845 | 1.88300 | 40.78 |
| 3 | −4.2351 | 0.1400 | | |
| 4 | −46.8838 | 2.7835 | 1.56907 | 71.30 |
| 5 | −15.1425 | 0.1400 | | |
| 6 | 418.2838 | 1.7656 | 1.49700 | 81.54 |
| 7 | −20.9203 | 0.1000 | | |
| 8 | 13.4453 | 6.0000 | 1.49700 | 81.61 |
| 9 | −13.3867 | 1.4172 | 1.61340 | 43.84 |
| 10 | 12.1793 | 6.0818 | 1.43875 | 94.99 |
| 11 | −15.3973 | 0.2000 | | |
| 12 | 45.6989 | 1.6020 | 1.64450 | 40.82 |
| 13 | 5.8324 | 5.6861 | 1.49700 | 81.54 |
| 14 | −42.6139 | 0.1400 | | |
| 15 | 14.2362 | 2.3557 | 1.49700 | 81.54 |
| 16 | −50.0000 | 3.9438 | 1.52944 | 51.72 |
| 17 | 9.8227 | 1.9000 | | |
| 18 | −6.4476 | 1.1499 | 1.52944 | 51.72 |
| 19 | 9.6911 | 2.9575 | 1.56907 | 71.30 |
| 20 | −93.3387 | 0.1000 | | |
| 21 | 19.1157 | 3.0000 | 1.49700 | 81.54 |
| 22 | −10.7338 | 0.1000 | | |
| 23 | 9.4998 | 7.5241 | 1.49700 | 81.54 |
| 24 | −5.7731 | 0.6326 | 1.64450 | 40.82 |
| 25 | 4.6453 | 1.7000 | | |
| 26 | −4.2338 | 2.6782 | 1.58313 | 59.38 |
| 27 | 19.6332 | 8.7151 | 1.74000 | 31.71 |
| 28 | −11.0608 | | | |

$\beta = -60X$  NA = 1.4  F = 3.001 mm  WD = 0.138 mm
Condition (1) value: D/F = 22.954
Condition (4) value: $|\nu_{dpe} - \nu_{dne}|$ = 27.67
Condition (5) value: $|\nu_{dpi} - \nu_{dni}|$ = 19.58 – 40.72
Condition (6) value: $r_n/r_p$ = 0.432
Condition (7) value: $F/F_{g2a}$ = −0.221
Condition (8) value: $F/F_{g2c}$ = −0.115

FIG. 11A–11D show the spherical aberration, astigmatism, distortion and coma, respectively, of the objective lens of Embodiment 5. The spherical aberration and coma are given for each of the C, d, F, and g lines, and the astigmatism is given for the sagittal ΔS and meridional ΔM image surfaces. As is apparent from these figures, the aberrations are favorably corrected for the entire image field.

Embodiment 6

Figure 6:
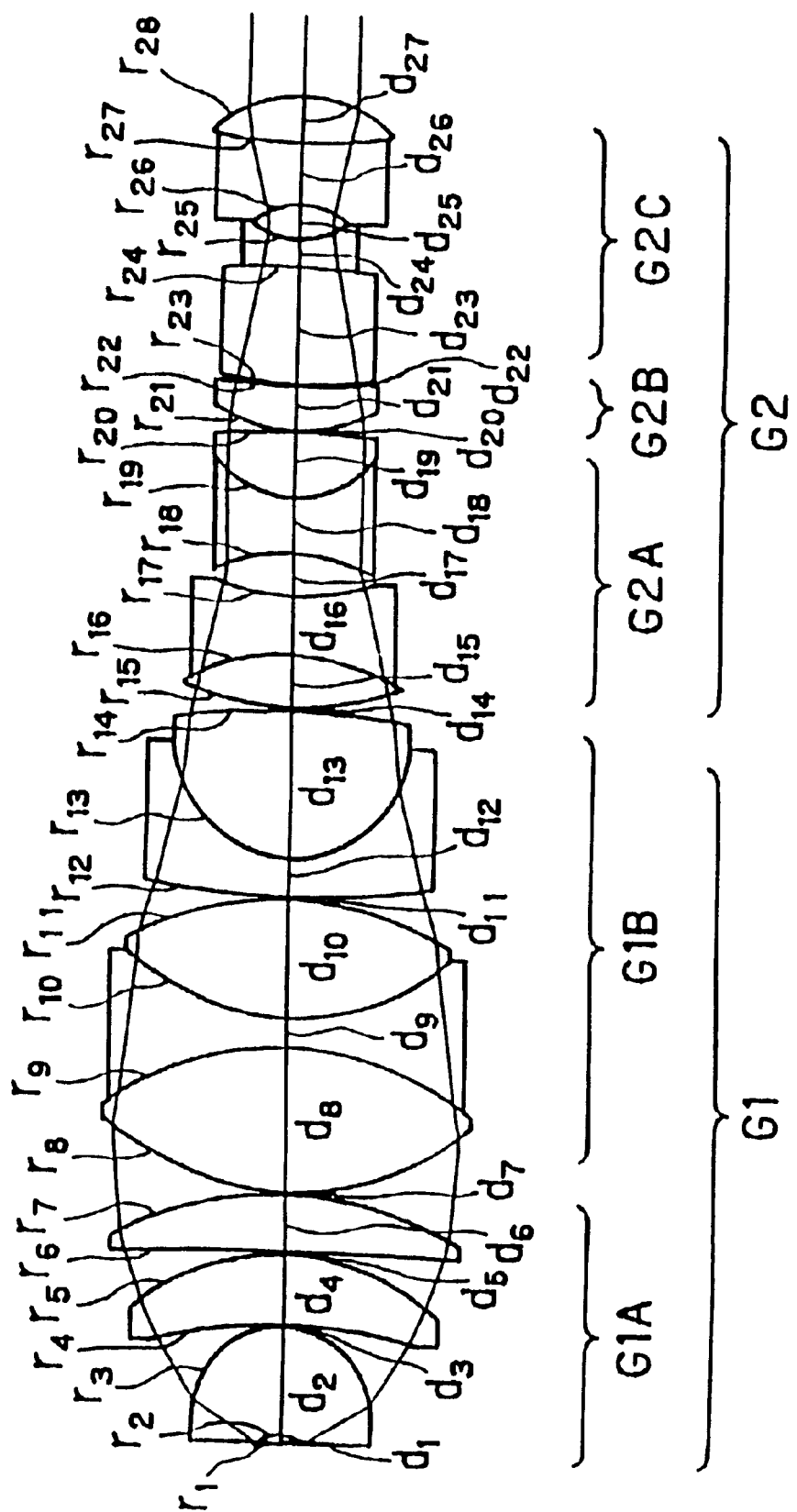
FIG. 6 is a cross section showing the lens element structure of the objective lens of Embodiment 6 according to the present invention.

As shown in FIG. 6, this embodiment includes, in order from the object side, a first lens group G1 and a second lens group G2. The first lens group G1 is formed of a lens subgroup G1A and a lens subgroup G1B. Lens subgroup G1A is a cemented doublet formed of a plano-convex lens element that is joined to a meniscus lens element with its concave surface on the object side, and two positive meniscus lens elements, each with its concave surface on the object side. Lens subgroup G1B is formed of a cemented triplet made of a biconvex lens element that is joined to a biconcave lens element, which in turn is joined to a biconvex lens element, and a cemented doublet made of a negative meniscus lens element with its concave surface on the image side that is joined to a biconvex lens element. The second lens group G2 is formed of lens subgroups G2A, G2B, and G2C, in order from the object side. Lens subgroup G2A is a Gauss lens set. In order from the object side, it is formed of two cemented doublets, as follows: a biconvex lens element that is joined to a biconcave lens element, and a biconcave lens element that is joined to a biconvex lens element. Lens subgroup G2B is formed of a positive meniscus lens element with its concave surface on the image side. Lens subgroup G2C is also a Gauss lens set. In order from the object side, it is formed of two cemented doublets, as follows: a biconvex lens element that is joined to a biconcave lens element, and a biconcave lens element that is joined to a biconvex lens element.

This embodiment is designed with a cover glass having a refractive index of 1.521, an Abbe number of 56.02, and a thickness of 0.17 mm. This embodiment uses liquid immersion. The immersion liquid between the object surface and the first lens surface of the first lens group G1 has a refractive index of 1.515 and an Abbe number of 43.1.

Table 6 below lists for each surface, in order from the object side, the surface number #, the radius of curvature R (in mm), the on-axis spacing D (in mm) between surfaces, as well as the index of refraction $N_d$ and the Abbe number $\upsilon_d$ (both at the d line) of each lens element of Embodiment 6. In the middle portion of the table are listed the values of the magnification β of the objective lens when combined with an imaging lens having a focal length of 180 mm, the numerical aperture NA, the focal length F of the entire microscope objective lens system, and the working distance WD between the object surface and the first lens surface of the first lens group G1. In the bottom portion of the table are listed the values corresponding to the listed Conditions.

TABLE 6

| # | R | D | $N_d$ | $\upsilon_d$ |
|---|---|---|---|---|
| 1 | ∞ | 0.2500 | 1.51633 | 64.15 |
| 2 | −1.9941 | 5.5029 | 1.88300 | 40.78 |
| 3 | −4.1722 | 0.1400 | | |
| 4 | −20.3414 | 2.8793 | 1.56907 | 71.30 |
| 5 | −10.5617 | 0.1400 | | |
| 6 | −236.7024 | 2.5000 | 1.49700 | 81.54 |
| 7 | −16.5586 | 0.1000 | | |
| 8 | 12.8110 | 6.5000 | 1.49700 | 81.61 |
| 9 | −13.6649 | 1.3099 | 1.61340 | 43.84 |
| 10 | 10.9749 | 5.3317 | 1.43875 | 94.99 |
| 11 | −15.3028 | 0.2000 | | |
| 12 | 39.3953 | 1.5345 | 1.64450 | 40.82 |
| 13 | 5.3255 | 6.8471 | 1.49700 | 81.54 |
| 14 | −31.5730 | 0.1400 | | |
| 15 | 12.8901 | 2.4489 | 1.49700 | 81.54 |
| 16 | −9.8360 | 2.5528 | 1.52944 | 51.72 |
| 17 | 10.3437 | 1.9000 | | |
| 18 | −8.0724 | 2.3354 | 1.52944 | 51.72 |
| 19 | 4.4863 | 3.0000 | 1.56907 | 71.30 |
| 20 | −59.3093 | 0.1000 | | |
| 21 | 6.9152 | 2.0000 | 1.43875 | 94.99 |

TABLE 6-continued

| 22 | 31.3695 | 0.1000 | | |
|---|---|---|---|---|
| 23 | 18.5765 | 5.3014 | 1.43875 | 94.99 |
| 24 | −35.4066 | 1.1608 | 1.64450 | 40.82 |
| 25 | 3.4169 | 1.7000 | | |
| 26 | −3.3003 | 2.7364 | 1.58313 | 59.38 |
| 27 | 25.6852 | 2.0815 | 1.74000 | 31.71 |
| 28 | −6.1432 | | | |

| β = −100X | NA = 1.4 | F = 1.8 mm | WD = 0.14 mm |
|---|---|---|---|
| Condition (1) value: | D/F | = | 33.851 |
| Condition (4) value: | $\|\upsilon_{dpe} - \upsilon_{dne}\|$ | = | 27.67 |
| Condition (5) value: | $\|\upsilon_{dpi} - \upsilon_{dni}\|$ | = | 19.58 – 54.17 |
| Condition (6) value: | $r_n/r_p$ | = | 0.478 |
| Condition (7) value: | $F/F_{g2a}$ | = | −0.088 |
| Condition (8) value: | $F/F_{g2c}$ | = | −0.147 |

FIGS. 12A–12D show the spherical aberration, astigmatism, distortion and coma, respectively, of the objective lens of Embodiment 6. The spherical aberration and coma are given for each of the C, d, F, and g lines, and the astigmatism is given for the sagittal ΔS and meridional ΔM image surfaces. As is apparent from these figures, the aberrations are favorably corrected for the entire image field.

The objective lens in the above embodiments can be used with, for instance, an imaging lens having the construction parameters given in Table 7 below. This table lists the surface number # in order from the object side, the radius of curvature R (in mm), the on-axis spacing D (in mm) between surfaces, as well as the index of refraction $N_d$ and the Abbe number $\upsilon_d$ (both at the d line) of each lens element of the imaging lens.

TABLE 7

| # | R | D | $N_d$ | $\upsilon_d$ |
|---|---|---|---|---|
| 1 | 68.7541 | 7.7321 | 1.48749 | 70.20 |
| 2 | −37.5679 | 3.4742 | 1.80610 | 40.95 |
| 3 | −102.8477 | 0.6973 | | |
| 4 | 84.3099 | 6.0238 | 1.83400 | 37.16 |
| 5 | −50.7100 | 3.0298 | 1.64450 | 40.82 |
| 6 | 40.6619 | | | |

The invention being thus described, it will be obvious that the same may be varied in many ways. For example, the values of R and D may be readily scaled to achieve a lens of a different focal length. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. A microscope objective lens comprising, in sequential order from the object side:

a first lens group of positive refractive power; and a second lens group, said second lens group including at least two Gauss lens sets, wherein each Gauss lens set is formed of, in sequential order from the object side, a first meniscus-shaped optical element with its concave surface on the image side and a second meniscus-shaped optical element with its concave surface on the object side.

2. The microscope objective lens according to claim 1, wherein the following Condition (1) is satisfied:

$3 \leq D/F \leq 35$     Condition (1)

where
D is the distance between an object and the lens surface of the microscope objective lens that is nearest the image side, and
F is the focal length of the microscope objective lens.

3. The microscope objective lens according to claim 1 wherein, among the at least two Gauss lens sets, at least two of the meniscus-shaped optical elements are each formed of a lens element of positive refractive power and a lens element of negative refractive power that are cemented together.

4. The microscope objective lens according to claim 3, wherein the meniscus-shaped optical element that is nearest the image is formed of a lens element of positive refractive power and a lens element of negative refractive power that are cemented together, and wherein the following Conditions (2) and (3) are satisfied:

$$\upsilon_{dne} > \upsilon_{dpe} \qquad \text{Condition (2)}$$

$$\upsilon_{dpi} > \upsilon_{dni} \qquad \text{Condition (3)}$$

where
$\upsilon_{dne}$ and $\upsilon_{dpe}$ are the Abbe numbers, at the d line, of the negative and positive lens elements, respectively, that are cemented together to form the meniscus-shaped optical element that is nearest the image side of the Gauss lens set of the second lens group that is nearest the image side, and $\upsilon_{dpi}$ and $\upsilon_{dni}$ are the Abbe numbers, at the d line, of the positive and negative lens elements, respectively, that are cemented together to form one or more additional (i=1, and possibly higher) of the meniscus-shaped optical element(s) of the Gauss lens sets of the second lens group.

5. The microscope objective lens according to claim 1, wherein each meniscus-shaped optical element of each Gauss lens set is formed of at least two lens elements that are cemented together.

6. The microscope objective lens according to claim 4, wherein the following Conditions (4) and (5) are satisfied:

$$|\upsilon_{dpe} - \upsilon_{dne}| \geq 15 \qquad \text{Condition (4)}$$

$$|\upsilon_{dpi} - \upsilon_{dni}| \geq 10 \qquad \text{Condition (5)}.$$

7. The microscope objective lens according to claim 1, wherein the first lens group is formed of, in order from the object side, two meniscus lens elements each with its concave surface on the object side, and a lens subgroup that includes at least two interfaces, with each interface being two optical surfaces of different optical materials that are cemented together, and the following Condition (6) is satisfied:

$$0.3 \leq r_n/r_p \leq 1 \qquad \text{Condition (6)}$$

where
$r_n$ is the radius of curvature of the concave surface which faces the object side, of the meniscus lens in the first lens group that is nearest the object side, and
$r_p$ is the radius of curvature of the convex surface which faces the image side, of the meniscus lens in the first lens group that is nearest the object side.

8. The microscope objective lens according to claim 1, wherein the first lens group is formed of, in order from the object side, a plano-convex lens element that is cemented to a meniscus lens element with its concave surface on the object side, a meniscus lens element with its concave surface on the object side, and a lens subgroup that includes at least two interfaces, with each interface being two surfaces of different optical materials that are cemented together, and the following Condition (6) is satisfied:

$$0.3 \leq r_n/r_p \leq 1 \qquad \text{Condition (6)}$$

where
$r_n$ is the radius of curvature of the concave surface which faces the object side, of the meniscus lens in the first lens group that is nearest the object side, and
$r_p$ is the radius of curvature of the convex surface which faces the image side, of the meniscus lens in the first lens group that is nearest the object side.

9. The microscope objective lens according to claim 1, wherein the second lens group includes no more than two of said Gauss lens sets.

10. The microscope objective lens according to claim 9, wherein the following Condition (7) is satisfied:

$$-0.8 \leq F/F_{g2a} \leq 0 \qquad \text{Condition (7)}$$

where,
F is the focal length of the microscope objective lens, and
$F_{g2a}$ is the focal length of the Gauss lens set that is nearer the object.

11. The microscope objective lens according to claim 9, wherein the following Condition (8) is satisfied:

$$-0.2 \leq F/F_{g2c} \leq 0.05 \qquad \text{Condition (8)}$$

where
F is the focal length of the microscope objective lens, and
$F_{g2c}$ is the focal length of the Gauss lens set that is nearer the image.

12. The microscope objective lens according to claim 11, wherein the following Condition (9) is satisfied:

$$-0.1 F/F_{g2c} \leq -0.01 \qquad \text{Condition (9)}.$$

13. The microscope objective lens according to claim 9, wherein a lens of positive refractive power is positioned between the two Gauss lens sets.

14. The microscope objective lens according to claim 9, wherein the following Condition (1) is satisfied $$3 \leq D/F \leq 35 \qquad \text{Condition (1)}$$

where
D is the distance between an object and the lens surface of the microscope objective lens that is nearest the image side, and
F is the focal length of the microscope objective lens.

15. A microscope objective lens comprising, in sequential order from the object side:
a first lens group of positive refractive power; and
a second lens group, said second lens group including at least two, and no more than two, Gauss lens sets, wherein each Gauss lens set is formed of, in sequential order from the object side, a first meniscus-shaped optical element with its concave surface on the image side and a second meniscus-shaped optical element with its concave surface on the object side, with each of the meniscus-shaped optical elements being formed of a lens element of positive refractive power and a lens element of negative refractive power that are cemented together;

and wherein the following Conditions (4) and (5) are satisfied:

$$|\upsilon_{dpe}-\upsilon_{dne}|\geq 15 \qquad \text{Condition (4)}$$

$$|\upsilon_{dpi}-\upsilon_{dni}|\geq 10 \qquad \text{Condition (5)}$$

where $\upsilon_{dpe}$ and $\upsilon_{dne}$ are the Abbe numbers, at the d line, of the positive lens element and the negative lens element, respectively, that, when cemented together, form the meniscus-shaped optical element that is nearest the image side of the Gauss lens set of the second lens group that is nearest the image side, and $\upsilon_{dpi}$ and $\upsilon_{dni}$ are the Abbe numbers, at the d line, of the positive and negative lens elements, respectively, that, when cemented together, form the other three (i=1, 2, 3) meniscus-shaped optical element(s) of the Gauss lens sets of the second lens group.

16. A microscope objective lens comprising, in sequential order from the object side:

a first lens group of positive refractive power that includes two meniscus lenses; and a second lens group, said second lens group including at least two, and no more than two, Gauss lens sets, wherein each Gauss lens set is formed of, in sequential order from the object side, a first meniscus-shaped optical element with its concave surface on the image side and a second meniscus-shaped optical element with its concave surface on the object side, with each of the meniscus-shaped optical elements of the Gauss lens sets being formed of a lens element of positive refractive power and a lens element of negative refractive power that are cemented together;

and wherein the following Condition (6) is satisfied:

$$0.3\leq r_n/r_p\leq 1 \qquad \text{Condition (6)}$$

where $r_n$ is the radius of curvature of the concave surface which faces the object side, of the meniscus lens in the first lens group that is nearest the object side, and $r_p$ is the radius of curvature of the convex surface which faces the image side, of the meniscus lens in the first lens group that is nearest the object side.

17. The microscope objective lens according to claim 1, wherein the first lens group comprises a meniscus lens element with its concave surface on the object side, and a lens subgroup that includes at least two interfaces, with each interface being two optical surfaces of different materials that are cemented together, and the following Condition (6) is satisfied:

$$0.3\leq r_n/r_p\leq 1 \qquad \text{Condition (6)}$$

where $r_n$ is the radius of curvature of the concave surface which faces the object side, of the meniscus lens in the first lens group that is nearest the object side, and $r_p$ is the radius of curvature of the convex surface which faces the image side, of the meniscus lens in the first lens group that is nearest the object side.

* * * * *